Feb. 21, 1933.   J. C. MONTEITH   1,898,256
VEHICLE BUMPER
Filed June 10, 1930
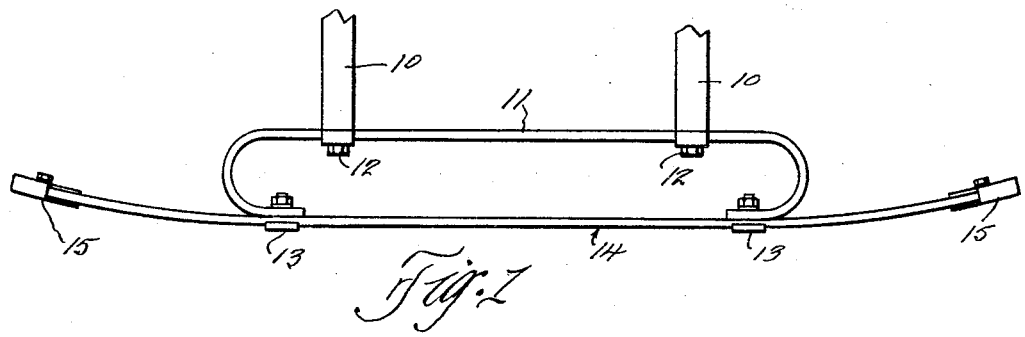
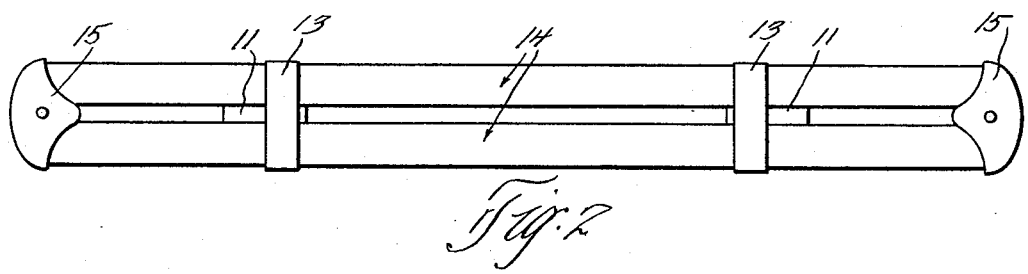
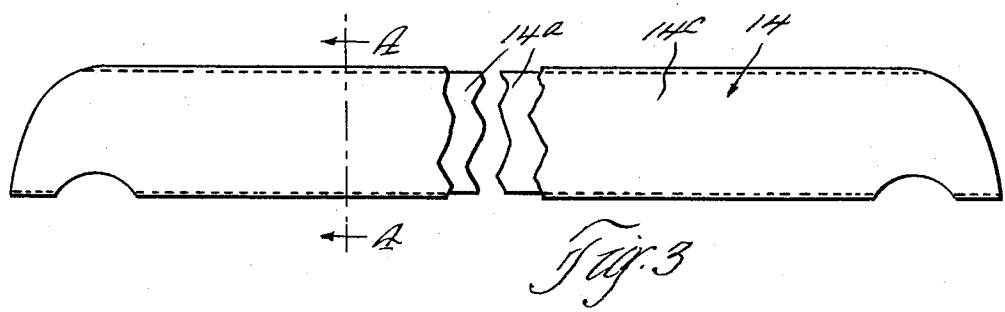
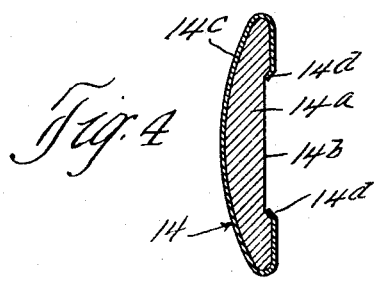
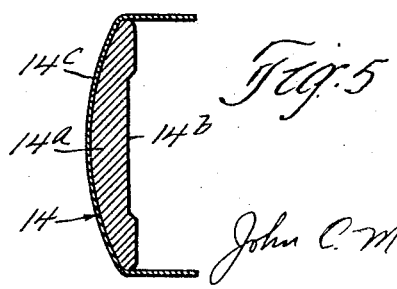
Inventor
John C. Monteith
By Hull Birch & West
Attorney Patented Feb. 21, 1933

1,898,256

UNITED STATES PATENT OFFICE

JOHN C. MONTEITH, OF CLEVELAND, OHIO, ASSIGNOR, BY MESNE ASSIGNMENTS, TO EATON MANUFACTURING COMPANY, OF CLEVELAND, OHIO, A CORPORATION OF OHIO

VEHICLE BUMPER

Application filed June 10, 1930. Serial No. 460,254.

This invention relates to a vehicle bumper and particularly to a composite bar from a plurality of which the major portion of such bumper is made up and the construction of such bar for use in the complete bumper.

The principal object of this invention is to provide at minimum manufacturing cost a satisfactory and extremely durable as well as simple and efficient bumper. A more limited object is to provide a composite bar consisting of a resilient foundation bar having a channel rear surface and covered with a finishing or veneering sheet of stainless steel or other material capable of taking a high polish or an electroplated veneering covering, a stainless steel veneer being preferable.

Fig. 1 is a plan view of my improved bumper; Fig. 2 is a front elevation thereof; Fig. 3 is an elevation of one of the composite bars; Fig. 4 is a section on line 4—4 of Fig. 3 and Fig. 5 is a view showing an intermediate step in process of making the bar of Fig. 3.

In the drawing the frame members of the vehicle are denoted by the numeral 10 and are provided with suitable openings to receive a portion 11 of the complete bumper secured in place by screws 12. The portion 11 is bent as shown and is secured to the front bumper bars intermediate the ends thereof as by clamps and bolts 13. The front bars 14 extend parallel to each other and are connected at the ends by mask plates 15.

Each of the bars 14 consists of a foundation bar $14^a$ provided with a channel $14^b$ in the rear surface and having a curved front surface, although the front surface may be of different contour, if desired. Conforming closely to the front surface and extending around the edges of the bar $14^a$ is a protecting covering $14^c$ preferably of stainless steel the extreme edges $14^d$ of which are bent sharply to extend into the channel $14^b$. It is to be understood that the channel $14^b$ need not extend the full distance between the portions $14^d$ as shown in the drawing but that a plurality of narrow channels may be provided to receive these edges $14^d$.

In making the bars 14 a resilient channel bar $14^a$ is provided having at its rear surface one or more channels and having the front surface of any desired shape. A veneering covering $14^c$ is provided having a U-shaped cross section as seen in Fig. 5 shaped so that the bight portion thereof conforms to the front surface of the foundation bar $14^a$. The foundation bar is placed within the U-shaped covering and the leg portions or edges are rolled around the edges of the foundation bar and the extreme edges bent or rolled sharply over the edges of the channel $14^b$.

It is evident that this construction is susceptible of various changes without departing from the scope of my invention and while I have shown and described the preferred form, I wish it understood that I am not limited by the details of the disclosure but only in accordance with the appended claims.

Having thus described my invention, what I claim is:

1. The method of producing a bumper bar which consists in providing a foundation bar having a channel in the rear surface and a covering therefor which is substantially U-shaped in cross-section, the bight of said U conforming substantially to the front surface of said channel bar, and rolling the legs of said U around the edges of said foundation bar and bending the ends thereof over channel edges in said foundation bar.

2. A composite bumper bar including, a foundation bar having a wide, shallow, centrally located channel in the rear surface thereof, and a finishing covering conforming to the front surface of said bar and having each edge extending around an edge of said bar and at a sharp angle over an edge of and into said channel.

3. A vehicle bumper including a plurality of composite bars connected together intermediate their ends and connected at said ends by mask plates, each said bar including a foundation bar having a channel in the rear surface thereof, and a finishing covering conforming to the front surface of said bar and each edge extending around an edge thereof and at a sharp angle over a channel edge into a channel in said rear surface.

4. A composite bumper bar including, a resilient foundation bar having a channel in the rear surface thereof, and a finishing covering conforming to the front surface of said bar and each edge extending around an edge thereof and at a sharp angle over a channel edge into said channel in said rear surface.

5. A bumper bar formed of spring steel and having a longitudinally extending channel in its rear face and said bar being sheathed in a covering of stainless steel the longitudinal edges of which are folded into said channel.

6. A bumper bar formed of spring steel and having a longitudinally extending channel in its rear face and said bar being sheathed in a covering of stainless steel the longitudinal edges of which are secured in said channel.

In testimony whereof, I hereunto affix my signature.

JOHN C. MONTEITH.